United States Patent
Wu

(10) Patent No.: US 8,250,765 B2
(45) Date of Patent: Aug. 28, 2012

(54) PRUNING HOOK WHOSE BLADES ARE DISPOSED AT A CLOSED STATE WHEN NOT IN USE

(75) Inventor: Shih-Piao Wu, Changhua Hsien (TW)

(73) Assignee: Jiin Haur Industrial Co., Ltd., Changhua Hsien (TW)

( * ) Notice: Subject to any disclaimer, the term of this patent is extended or adjusted under 35 U.S.C. 154(b) by 592 days.

(21) Appl. No.: 12/506,488

(22) Filed: Jul. 21, 2009

(65) Prior Publication Data
US 2011/0016731 A1   Jan. 27, 2011

(51) Int. Cl.
*B26B 13/26* (2006.01)
(52) U.S. Cl. ............................................ 30/249; 30/245
(58) Field of Classification Search .................... 30/245, 30/246, 249, 296.1, 261, 262; 56/239, 241
See application file for complete search history.

(56) References Cited

U.S. PATENT DOCUMENTS

| 2,744,322 | A * | 5/1956 | Gustafson | 30/249 |
| 2,753,630 | A * | 7/1956 | Shoemaker | 30/249 |
| 2007/0119057 | A1 * | 5/2007 | Chen | 30/249 |
| 2009/0025828 | A1 * | 1/2009 | Chen | 30/249 |

* cited by examiner

*Primary Examiner* — Stephen Choi
(74) *Attorney, Agent, or Firm* — Alan Kamrath; Kamrath IP Lawfirm, PA

(57) ABSTRACT

A pruning hook includes an extension shank, a fixed blade mounted on a first end of the extension shank, a movable blade pivotally connected with the fixed blade, a driving cord connected with the movable blade to drive the movable blade relative to the fixed blade, a control member movably mounted on the extension shank and connected with the driving cord to drive the driving cord, and a positioning device mounted on the control member and detachably locked onto the extension shank to releasably lock the control member onto the extension shank. Thus, by provision of the positioning device, the movable blade and the fixed blade are disposed at a closed state when not in use to prevent the movable blade and the fixed blade from hurting a person.

19 Claims, 7 Drawing Sheets

PRUNING HOOK WHOSE BLADES ARE DISPOSED AT A CLOSED STATE WHEN NOT IN USE

BACKGROUND OF THE INVENTION

1. Field of the Invention

The present invention relates to a shearing tool and, more particularly, to a pruning hook for a gardening purpose to shear branches or leaves at a higher location.

2. Description of the Related Art

A conventional pruning hook comprises an elongate extension shank, a fixed blade mounted on the extension shank, a movable blade pivotally connected with and movable relative to the fixed blade, a driving cord connected with a first end of the movable blade to drive the movable blade to move toward the fixed blade, and an elastic member biased between a second end of the movable blade and the extension shank to drive the movable blade to move outwardly relative to the fixed blade. In operation, when the driving cord is driven by a user to overcome the elastic force of the elastic member, the driving cord drives the movable blade to move toward the fixed blade so as to perform a cutting action. On the contrary, when the pulling force applied on the driving cord disappears, the movable blade is driven by the restoring force of the elastic member to move outwardly relative to the fixed blade so that the movable blade and the fixed blade are opened at a normal state. However, the movable blade and the fixed blade are opened and spaced from each other at a normal state, so that the movable blade and the fixed blade easily hurt the user unintentionally when not in use, thereby causing danger to the user.

BRIEF SUMMARY OF THE INVENTION

In accordance with the present invention, there is provided a pruning hook, comprising an extension shank having a first end and a second end, a fixed blade mounted on the first end of the extension shank, a movable blade pivotally connected with and movable relative to the fixed blade, a driving cord connected with the movable blade to drive the movable blade to move relative to the fixed blade, a control member movably mounted on the extension shank and connected with the driving cord to drive and move the driving cord, and a positioning device mounted on the control member and detachably locked onto the extension shank to releasably lock the control member onto the extension shank. The second end of the extension shank has a side provided with a locking hole. The positioning device includes a receiving seat mounted on the control member, an adjusting cap mounted on the receiving seat, a positioning pin movably mounted in the receiving seat and having a first end provided with a locking stub detachably locked in the locking hole of the extension shank to releasably lock the control member onto the extension shank and a second end extending through and protruding outwardly from the adjusting cap, a rotation knob rotatably mounted on the adjusting cap and connected with the second end of the positioning pin to move the positioning pin relative to the extension shank, and a push spring mounted on the positioning pin and biased between the adjusting cap and the first end of the positioning pin to push the locking stub of the positioning pin toward the extension shank.

The primary objective of the present invention is to provide a pruning hook whose blades are disposed at a closed state when not in use to provide a protecting function to a user.

Another objective of the present invention is to provide a pruning hook, wherein when the movable blade and the fixed blade are closed, the locking stub of the positioning pin is inserted into and locked in the locking hole of the extension shank to lock the control member onto the extension shank so that the movable blade and the fixed blade are disposed at a closed state when not in use to prevent the movable blade and the fixed blade from hurting a person unintentionally.

A further objective of the present invention is to provide a pruning hook, wherein a user only needs to rotate the rotation knob so as to lock the control member onto the extension shank, thereby facilitating the user locking the control member and closing the movable blade and the fixed blade.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
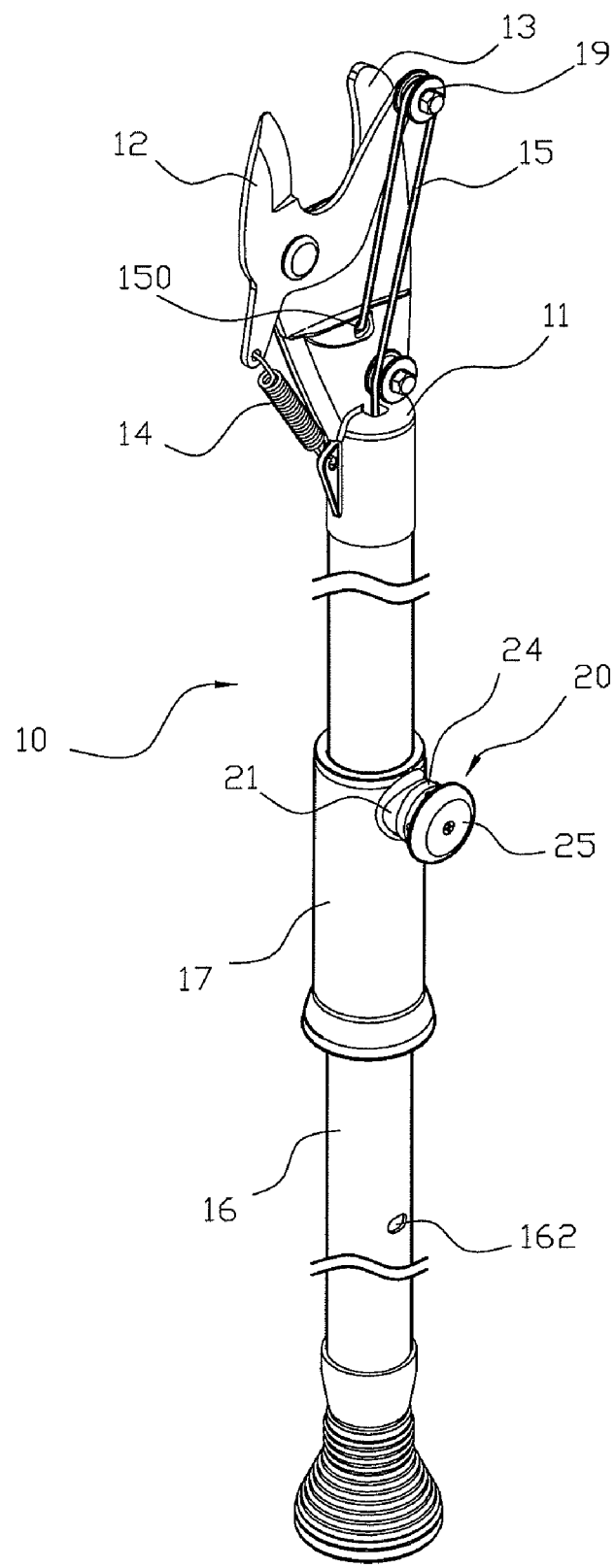
FIG. 1 is a perspective view of a pruning hook in accordance with the preferred embodiment of the present invention.
Figure 2:
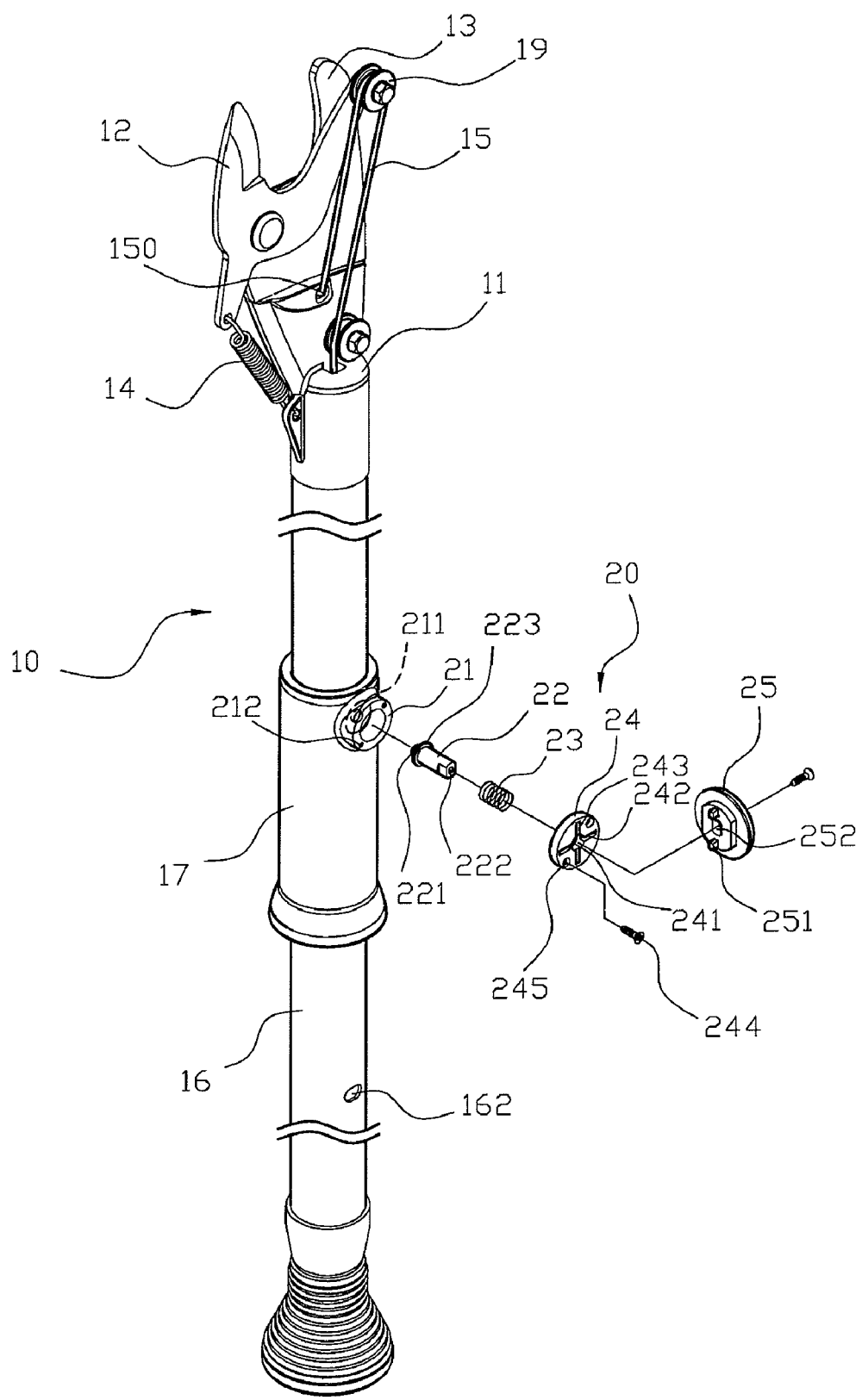
FIG. 2 is a partially exploded perspective view of the pruning hook as shown in FIG. 1.
Figure 3:
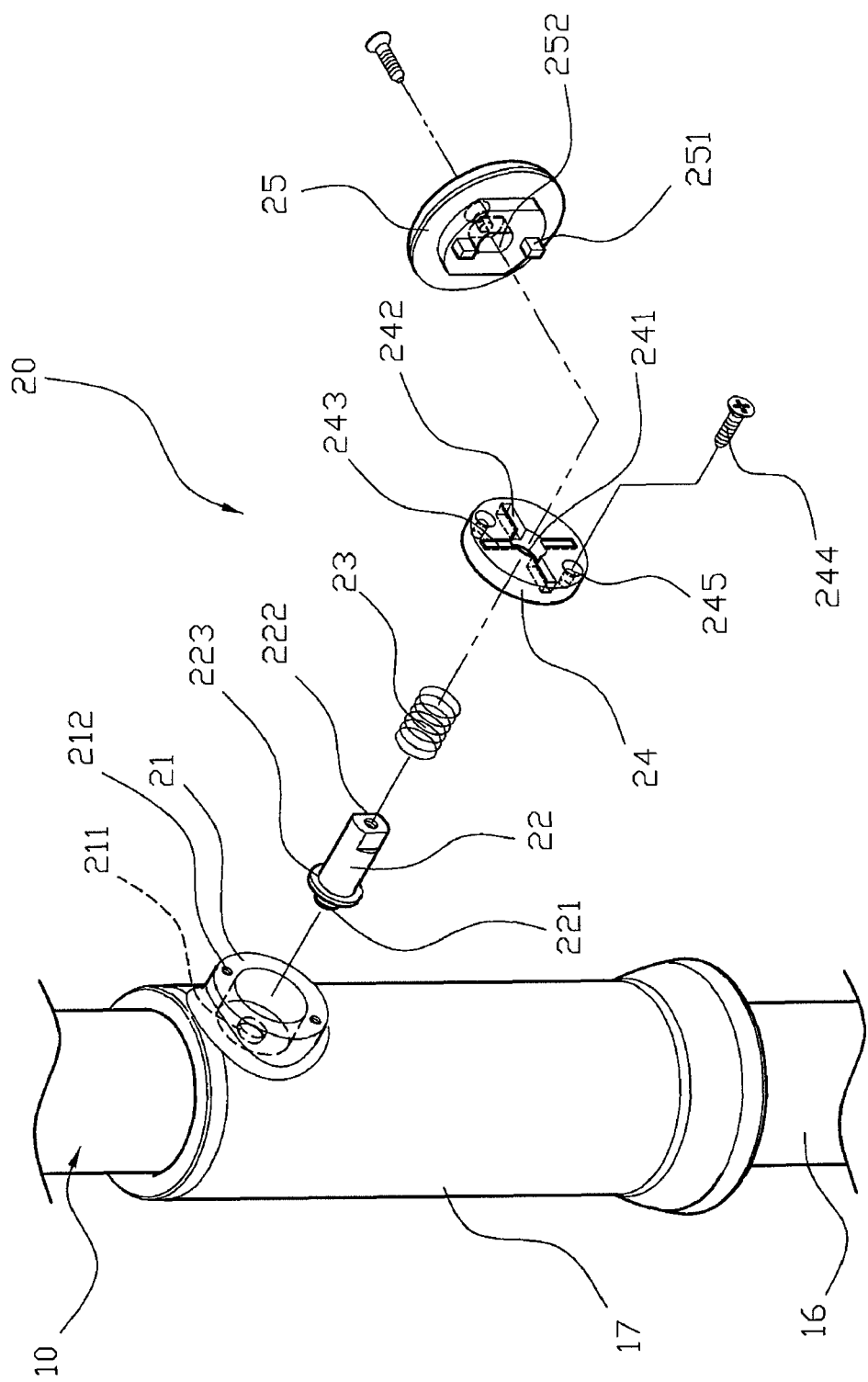
FIG. 3 is a locally enlarged view of the pruning hook as shown in FIG. 2.

Referring to the drawings and initially to FIGS. 1-6, a pruning hook in accordance with the preferred embodiment of the present invention comprises an extension shank 10 having a first end 11 and a second end 16, a fixed blade 13 mounted on the first end 11 of the extension shank 10, a movable blade 12 pivotally connected with and movable relative to the fixed blade 13, a driving cord 15 connected with the movable blade 12 to drive the movable blade 12 to move relative to the fixed blade 13, a control member 17 movably mounted on the extension shank 10 and connected with the driving cord 15 to drive and move the driving cord 15, and a positioning device 20 mounted on the control member 17 and detachably locked onto the extension shank 10 to releasably lock the control member 17 onto the extension shank 10.

The pruning hook further comprises a guide pulley 19 rotatably mounted on a first end of the movable blade 12, and an elastic member 14 biased between a second end of the movable blade 12 and the first end 11 of the extension shank 10 to drive the movable blade 12 to move outwardly relative to the fixed blade 13.

The extension shank 10 has a side provided with a protruding stop block 18 to stop and limit a further movement of the control member 17. The second end 16 of the extension shank 10 has a side provided with a locking hole 162. The driving cord 15 is pivotally mounted on the guide pulley 19 to drive the movable blade 12 to move toward the fixed blade 13. The driving cord 15 has a first end 150 secured on the fixed blade 13 and a second end 152 secured in the control member 17 to move in concert with the control member 17. The second end 152 of the driving cord 15 extends through the extension shank 10 and protrudes outwardly from the stop block 18 of the extension shank 10. The control member 17 is located outside of the extension shank 10 and is disposed between the stop block 18 of the extension shank 10 and the second end 16 of the extension shank 10.

The positioning device 20 includes a receiving seat 21 mounted on the control member 17, an adjusting cap 24 mounted on the receiving seat 21, a positioning pin 22 movably mounted in the receiving seat 21 and having a first end provided with a locking stub 221 detachably locked in the locking hole 162 of the extension shank 10 to releasably lock the control member 17 onto the extension shank 10 and a second end 222 extending through and protruding outwardly from the adjusting cap 24, a rotation knob 25 rotatably mounted on the adjusting cap 24 and connected with the second end 222 of the positioning pin 22 to move the positioning pin 22 relative to the extension shank 10, and a push spring 23 mounted on the positioning pin 22 and biased between the adjusting cap 24 and the first end of the positioning pin 22 to push the locking stub 221 of the positioning pin 22 toward the extension shank 10.

The receiving seat 21 of the positioning device 20 is integrally formed on and protrudes outwardly from the control member 17. The receiving seat 21 of the positioning device 20 has an annular shape and has a side provided with a through hole 211 to allow passage of the locking stub 221 of the positioning pin 22. The receiving seat 21 of the positioning device 20 has an open end face provided with two opposite screw bores 212. The through hole 211 of the receiving seat 21 is movable to align with the locking hole 162 of the extension shank 10 when the movable blade 12 and the fixed blade 13 are closed.

The adjusting cap 24 of the positioning device 20 is mounted on the open end face of the receiving seat 21 to seal the receiving seat 21 and has a periphery provided with two opposite through bores 245. The adjusting cap 24 of the positioning device 20 has a first side abutting the receiving seat 21 and a second side abutting the rotation knob 25. The second side of the adjusting cap 24 is provided with a first groove 242 and a second groove 243 having a depth smaller than that of the first groove 242. The first groove 242 and the second groove 243 of the adjusting cap 24 intersect each other to form a cross-shaped profile. The adjusting cap 24 of the positioning device 20 has a central portion provided with a shaft hole 241. The shaft hole 241 of the adjusting cap 24 is located at a center of the first groove 242 and the second groove 243 of the adjusting cap 24.

The positioning device 20 further includes two opposite locking screws 244 extending through the two through bores 245 of the adjusting cap 24 respectively and screwed into the two screw bores 212 of the receiving seat 21 to fix the adjusting cap 24 onto the receiving seat 21.

The positioning pin 22 of the positioning device 20 extends through and is rotatable in the shaft hole 241 of the adjusting cap 24. The positioning pin 22 of the positioning device 20 has a diameter flush with that of the shaft hole 241 of the adjusting cap 24. The positioning pin 22 of the positioning device 20 is limited between the receiving seat 21 and the adjusting cap 24. The first end of the positioning pin 22 is provided with an enlarged stop ring 223 abutting the push spring 23. The stop ring 223 of the positioning pin 22 is located at a connecting position of the locking stub 221 and the positioning pin 22. The second end 222 of the positioning pin 22 protrudes outwardly from the shaft hole 241 of the adjusting cap 24. The second end 222 of the positioning pin 22 has a non-circular cross-sectional profile with two flattened faces.

The push spring 23 of the positioning device 20 is received in the receiving seat 21 and is biased between the adjusting cap 24 and the stop ring 223 of the positioning pin 22.

The rotation knob 25 of the positioning device 20 has a side provided with two opposite adjusting blocks 251 which are selectively received in the first groove 242 or the second groove 243 of the adjusting cap 24. The rotation knob 25 of the positioning device 20 has a central portion provided with a fixing hole 252 secured on the second end 222 of the positioning pin 22 so that the positioning pin 22 is combined with the rotation knob 25 to rotate in concert with the rotation knob 25. The fixing hole 252 of the rotation knob 25 has a non-circular cross-sectional profile with two flattened faces. The fixing hole 252 of the rotation knob 25 is located at a center of the two adjusting blocks 251.

Thus, when the two adjusting blocks 251 of the rotation knob 25 are received in the first groove 242 of the adjusting cap 24, the locking stub 221 of the positioning pin 22 protrudes outwardly from the through hole 211 of the receiving seat 21 and is inserted into the locking hole 162 of the extension shank 10, and when the two adjusting blocks 251 of the rotation knob 25 are received in the second groove 243 of the adjusting cap 24, the locking stub 221 of the positioning pin 22 is detached from the locking hole 162 of the extension shank 10 and is retracted into the through hole 211 of the receiving seat 21.

Figure 4:
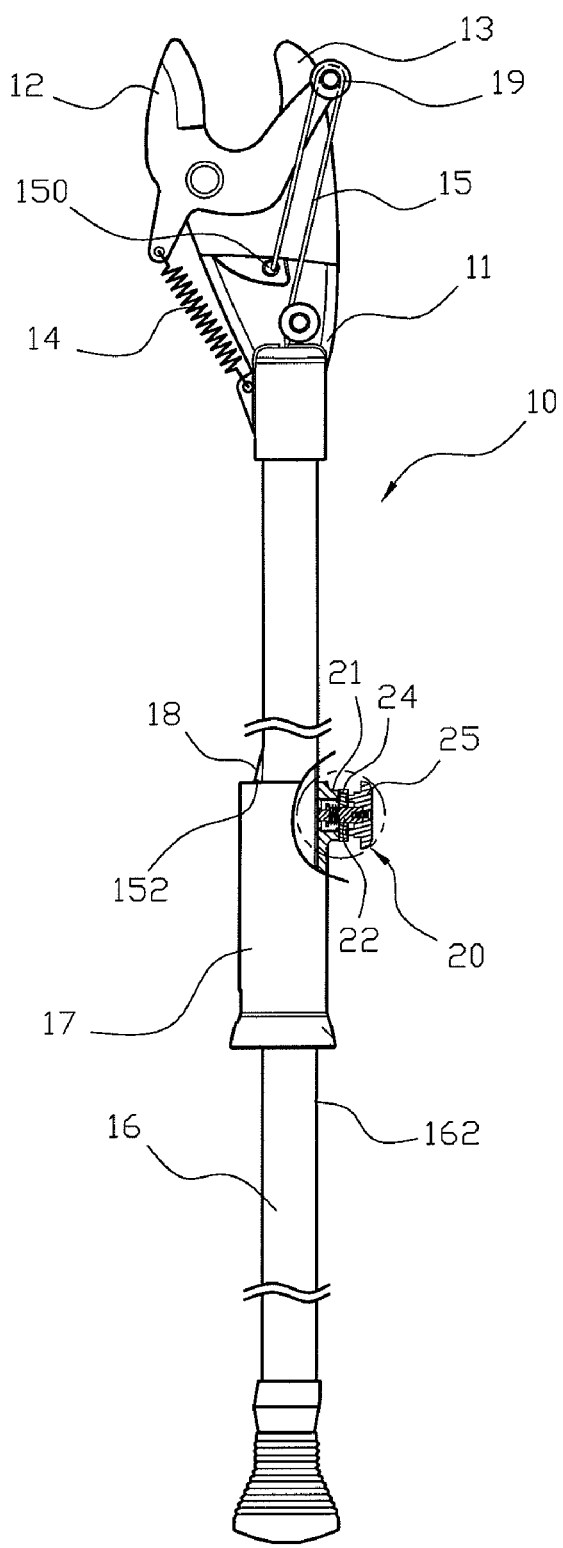
FIG. 4 is a partially side cross-sectional view of the pruning hook as shown in FIG. 1.
Figure 6:
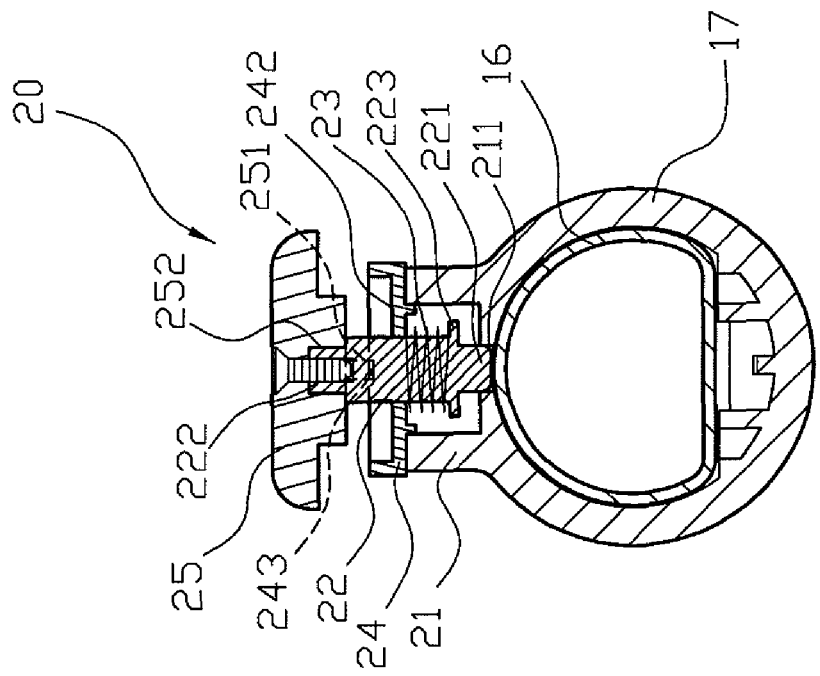
FIG. 6 is a locally enlarged view of the pruning hook as shown in FIG. 4.
Figure 5:
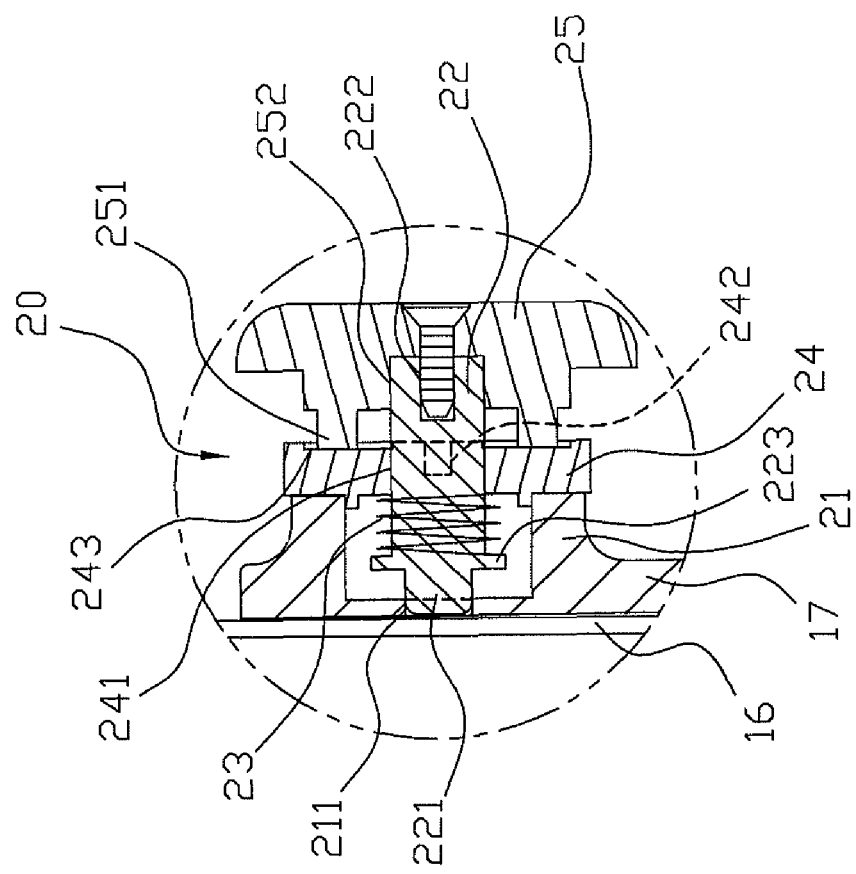
FIG. 5 is a locally enlarged view of the pruning hook as shown in FIG. 4.

In operation, referring to FIG. 1 with reference to FIGS. 2-6, when the control member 17 is driven by a user to overcome the elastic force of the elastic member 14 and to move outwardly relative to the movable blade 12, the driving cord 15 is driven by the control member 17 to move the guide pulley 19 which drives the movable blade 12 to move toward the fixed blade 13 so as to perform a cutting action. On the contrary, when the pulling force applied on the control member 17 disappears, the movable blade 12 is driven by the restoring force of the elastic member 14 to move outwardly relative to the fixed blade 13 so that the movable blade 12 and the fixed blade 13 are opened at a normal state as shown in FIG. 4. At this time, the control member 17 is moved to abut the stop block 18 which limits a further movement of the control member 17. In addition, the two adjusting blocks 251 of the rotation knob 25 are received in the second groove 243 of the adjusting cap 24, and the locking stub 221 of the positioning pin 22 is retracted into the through hole 211 of the receiving seat 21 as shown in FIG. 5 and will not interfere with movement of the control member 17 so that the control member 17 is movable on the extension shank 10 freely.

Figure 7:
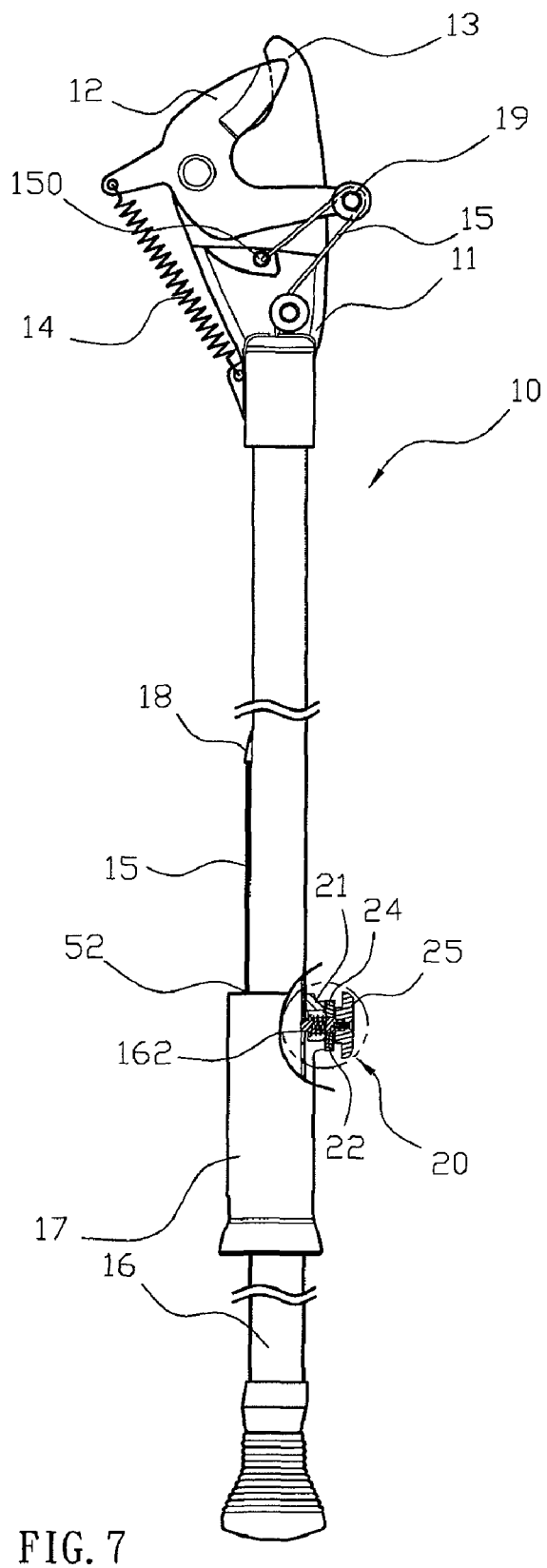
FIG. 7 is a schematic operational view of the pruning hook as shown in FIG. 4.
Figure 9:
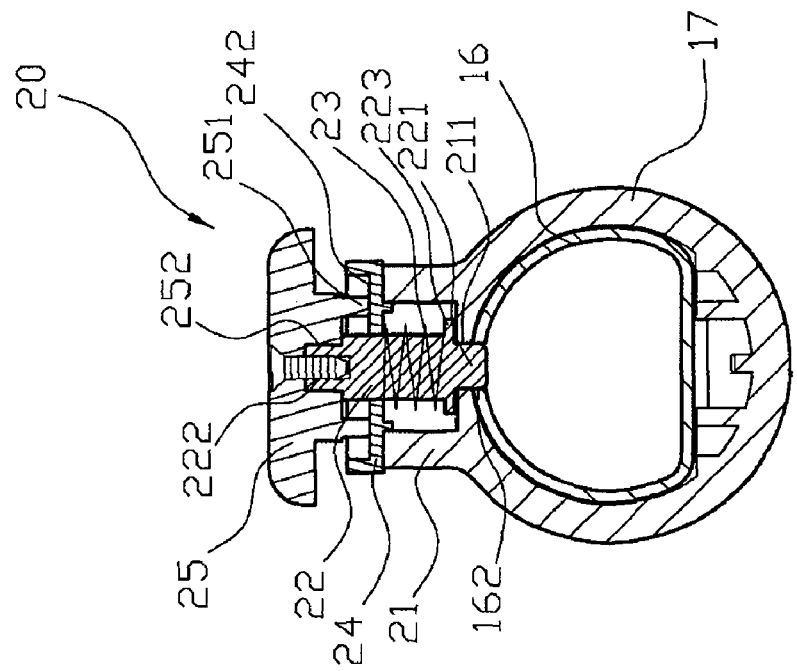
FIG. 9 is a schematic operational view of the pruning hook as shown in FIG. 6.
Figure 8:
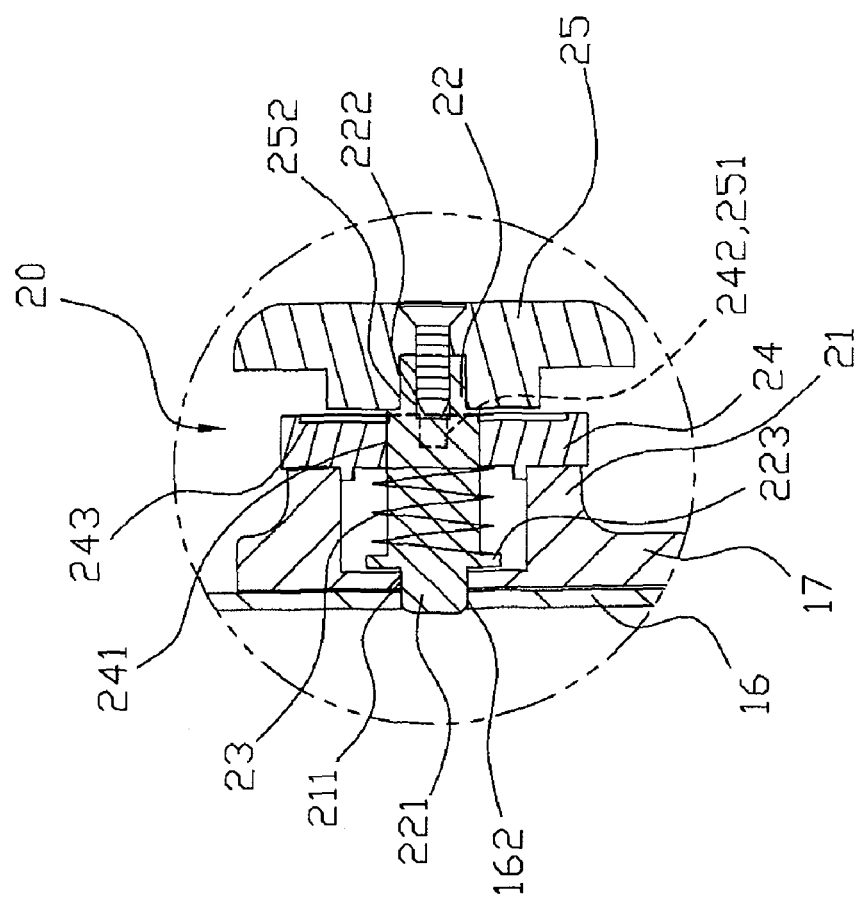
FIG. 8 is a schematic operational view of the pruning hook as shown in FIG. 5.

Referring to FIGS. 7-9 with reference to FIGS. 1-6, when a user wishes to close the movable blade 12 and the fixed blade 13, the control member 17 is driven to move outwardly relative to the movable blade 12 until the movable blade 12 and the fixed blade 13 are closed as shown in FIG. 7. At this time, the through hole 211 of the receiving seat 21 is moved to align with the locking hole 162 of the extension shank 10 when the movable blade 12 and the fixed blade 13 are closed. Then, the rotation knob 25 is moved outwardly relative to the adjusting cap 24 to detach the two adjusting blocks 251 of the rotation knob 25 from the second groove 243 of the adjusting cap 24. Then, the rotation knob 25 is rotated relative to the adjusting cap 24 until the two adjusting blocks 251 of the rotation knob 25 align with the first groove 242 of the adjusting cap 24. Then, the rotation knob 25 is pushed toward the adjusting cap 24 by the restoring force of the push spring 23 so that the two adjusting blocks 251 of the rotation knob 25 are inserted into the first groove 242 of the adjusting cap 24 as shown in FIG. 9. At the same time, the locking stub 221 of the positioning pin 22 is pushed toward the locking hole 162 of the extension shank 10 by the restoring force of the push spring 23 so that the locking stub 221 of the positioning pin 22 is inserted into and locked in the locking hole 162 of the extension shank 10 as shown in FIG. 8 to lock the control member 17 onto the extension shank 10. Thus, the movable blade 12 and the fixed blade 13 are disposed at a closed state when not in use.

Accordingly, when the movable blade 12 and the fixed blade 13 are closed, the locking stub 221 of the positioning pin 22 is inserted into and locked in the locking hole 162 of the extension shank 10 to lock the control member 17 onto the extension shank 10 so that the movable blade 12 and the fixed blade 13 are disposed at a closed state when not in use to prevent the movable blade 12 and the fixed blade 13 from hurting a person unintentionally. In addition, a user only needs to rotate the rotation knob 25 so as to lock the control member 17 onto the extension shank 10, thereby facilitating the user locking the control member 17 and closing the movable blade 12 and the fixed blade 13.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A pruning hook comprising:
an extension shank having a first end and a second end;
a fixed blade mounted on the first end of the extension shank;
a movable blade pivotally connected with and movable relative to the fixed blade;
a driving cord connected with the movable blade to drive the movable blade to move relative to the fixed blade;
a control member movably mounted on the extension shank and connected with the driving cord to drive and move the driving cord; and
a positioning device mounted on the control member and detachably locked onto the extension shank to releasably lock the control member onto the extension shank, wherein
the second end of the extension shank has a side provided with a locking hole; and
the positioning device includes:
a receiving seat mounted on the control member;
an adjusting cap mounted on the receiving seat;
a positioning pin movably mounted in the receiving seat and having a first end provided with a locking stub detachably locked in the locking hole of the extension shank to releasably lock the control member onto the extension shank and a second end extending through and protruding outwardly from the adjusting cap;
a rotation knob rotatably mounted on the adjusting cap and connected with the second end of the positioning pin to move the positioning pin relative to the extension shank; and
a push spring mounted on the positioning pin and biased between the adjusting cap and the first end of the positioning pin to push the locking stub of the positioning pin toward the extension shank.

2. The pruning hook of claim 1, wherein the receiving seat of the positioning device has a side provided with a through hole to allow passage of the locking stub of the positioning pin.

3. The pruning hook of claim 1, wherein the first end of the positioning pin is provided with an enlarged stop ring abutting the push spring.

4. The pruning hook of claim 3, wherein the stop ring of the positioning pin is located at a connecting position of the locking stub and the positioning pin.

5. The pruning hook of claim 3, wherein
the positioning pin of the positioning device is limited between the receiving seat and the adjusting cap; and
the push spring of the positioning device is received in the receiving seat and is biased between the adjusting cap and the stop ring of the positioning pin.

6. The pruning hook of claim 1, wherein
the receiving seat of the positioning device has an open end face provided with two opposite screw bores;
the adjusting cap of the positioning device is mounted on the open end face of the receiving seat to seal the receiving seat;
the adjusting cap of the positioning device has a periphery provided with two opposite through bores; and
the positioning device further includes two opposite locking screws extending through the two through bores of the adjusting cap respectively and screwed into the two screw bores of the receiving seat to fix the adjusting cap onto the receiving seat.

7. The pruning hook of claim 1, wherein the receiving seat of the positioning device is integrally formed on and protrudes outwardly from the control member.

8. The pruning hook of claim 1, wherein the receiving seat of the positioning device has an annular shape.

9. The pruning hook of claim 1, wherein
the extension shank has a side provided with a protruding stop block to stop and limit a further movement of the control member;
the driving cord has a first end secured on the fixed blade and a second end secured in the control member to move in concert with the control member;
the second end of the driving cord extends through the extension shank and protrudes outwardly from the stop block of the extension shank; and
the control member is located outside of the extension shank and is disposed between the stop block of the extension shank and the second end of the extension shank.

10. The pruning hook of claim 1, wherein
the pruning hook further comprises:
a guide pulley rotatably mounted on a first end of the movable blade;
an elastic member biased between a second end of the movable blade and the first end of the extension shank to drive the movable blade to move outwardly relative to the fixed blade; and
the driving cord is pivotally mounted on the guide pulley to drive the movable blade to move toward the fixed blade.

11. The pruning hook of claim 2, wherein
the adjusting cap of the positioning device has a first side abutting the receiving seat and a second side abutting the rotation knob;
the second side of the adjusting cap is provided with a first groove and a second groove having a depth smaller than that of the first groove; and
the rotation knob of the positioning device has a side provided with two opposite adjusting blocks which are selectively received in the first groove or the second groove of the adjusting cap.

12. The pruning hook of claim 2, wherein the through hole of the receiving seat is movable to align with the locking hole of the extension shank when the movable blade and the fixed blade are closed.

13. The pruning hook of claim 11, wherein
when the two adjusting blocks of the rotation knob are received in the first groove of the adjusting cap, the locking stub of the positioning pin protrudes outwardly from the through hole of the receiving seat and is inserted into the locking hole of the extension shank; and
when the two adjusting blocks of the rotation knob are received in the second groove of the adjusting cap, the locking stub of the positioning pin is detached from the locking hole of the extension shank and is retracted into the through hole of the receiving seat.

14. The pruning hook of claim 11, wherein
the adjusting cap of the positioning device has a central portion provided with a shaft hole; and
the positioning pin of the positioning device extends through and is rotatable in the shaft hole of the adjusting cap.

15. The pruning hook of claim 14, wherein
the first groove and the second groove of the adjusting cap intersect each other to form a cross-shaped profile; and
the shaft hole of the adjusting cap is located at a center of the first groove and the second groove of the adjusting cap.

16. The pruning hook of claim 14, wherein the positioning pin of the positioning device has a diameter flush with that of the shaft hole of the adjusting cap.

17. The pruning hook of claim 14, wherein
the second end of the positioning pin protrudes outwardly from the shaft hole of the adjusting cap; and
the rotation knob of the positioning device has a central portion provided with a fixing hole secured on the second end of the positioning pin so that the positioning pin is combined with the rotation knob to rotate in concert with the rotation knob.

18. The pruning hook of claim 17, wherein the fixing hole of the rotation knob is located at a center of the two adjusting blocks.

19. The pruning hook of claim 17, wherein
the second end of the positioning pin has a non-circular cross-sectional profile with two flattened faces; and
the fixing hole of the rotation knob has a non-circular cross-sectional profile with two flattened faces.

* * * * *